United States Patent
Naimer et al.

(10) Patent No.: US 7,046,170 B2
(45) Date of Patent: May 16, 2006

(54) ANP/RNP DISPLAY

(75) Inventors: Hubert Naimer, Mascona (CH); Ted Naimer, Ascona (CH); Jim Brannen, Lawrenceville, GA (US); Tom Lawrence, Knoxville, TN (US); Grady Dees, Tucson, AZ (US); Gerald M. Harkin, Tucson, AZ (US)

(73) Assignee: Universal Avionics Systems Corporation, Norcross, GA (US)

( * ) Notice: Subject to any disclaimer, the term of this patent is extended or adjusted under 35 U.S.C. 154(b) by 50 days.

(21) Appl. No.: 10/662,236

(22) Filed: Sep. 15, 2003

(65) Prior Publication Data

US 2005/0057376 A1 Mar. 17, 2005

(51) Int. Cl.
*G08B 21/00* (2006.01)
(52) U.S. Cl. .............. 340/945; 340/963; 340/971; 340/979
(58) Field of Classification Search ........ 340/945, 340/963, 971, 979
See application file for complete search history.

(56) References Cited

U.S. PATENT DOCUMENTS

| | | | |
|---|---|---|---|
| 3,643,258 A * | 2/1972 | Balding | 342/413 |
| 3,668,622 A | 6/1972 | Gannett et al. | 340/27 R |
| 4,247,843 A | 1/1981 | Miller et al. | 340/27 NA |
| 4,750,127 A | 6/1988 | Leslie et al. | 364/428 |
| 4,774,670 A | 9/1988 | Palmieri | 364/446 |
| 4,914,733 A | 4/1990 | Gralnick | 340/961 |
| 5,179,377 A | 1/1993 | Hancock | 340/961 |
| 5,185,606 A * | 2/1993 | Verbaarschot et al. | 340/961 |
| 5,227,786 A | 7/1993 | Hancock | 340/961 |
| 5,248,968 A | 9/1993 | Kelly et al. | 340/961 |
| 5,250,947 A * | 10/1993 | Worden et al. | 340/973 |
| 5,382,954 A | 1/1995 | Kennedy, Jr. et al. | 340/961 |
| 5,493,309 A | 2/1996 | Bjornholt | 342/455 |
| 5,668,542 A | 9/1997 | Wright | 340/971 |
| 5,739,770 A | 4/1998 | Liden | 340/976 |
| 5,872,526 A | 2/1999 | Tognazzini | 340/961 |
| 5,920,321 A | 7/1999 | Owen et al. | 345/427 |
| 6,085,150 A | 7/2000 | Henry et al. | 701/301 |
| 6,259,378 B1 | 7/2001 | Block | 340/963 |
| 6,271,768 B1 | 8/2001 | Frazier, Jr. et al. | 340/961 |
| 6,400,283 B1 | 6/2002 | Berlioz et al. | 340/975 |
| 6,507,288 B1 | 1/2003 | Block | 340/963 |
| 6,571,155 B1 * | 5/2003 | Carriker et al. | 701/3 |
| 2004/0189492 A1 * | 9/2004 | Selk et al. | 340/973 |

* cited by examiner

*Primary Examiner*—Julie Bichngoc Lieu
(74) *Attorney, Agent, or Firm*—John R. Wahl, Esq.; Greenberg Taurig, LLP

(57) ABSTRACT

A graphical display or presentation of lateral ANP/RNP information for RNAV environments. The display may also be adapted to present aircraft data for monitoring the vertical flight performance of an aircraft under RVSM.

16 Claims, 1 Drawing Sheet

ANP/RNP DISPLAY

BACKGROUND AND SUMMARY OF THE INVENTION

Situational awareness refers to the degree of accuracy by which one's perception of his current environment mirrors reality. With regard to the operation of an aircraft, situational awareness relates to a pilot's perception of what is happening to the aircraft within the four dimensions of space and time. Situational awareness also relates to the pilot's comprehension of a present situation and a projection of the status of the aircraft into the near future.

During the operation of an aircraft, multiple operational parameters and systems must be monitored simultaneously, including the airspeed, attitude, engines, fuel management, navigation indicators, and weather radar. Many of these operational parameters and systems on the aircraft must be supervised by a pilot reacting to subtle changes in the alignment of needles on gauges or of pictorial displays on screens.

The Flight Management System (FMS) has become the core computing and integration system that controls all navigational functions of an aircraft. The FMS provides the primary outputs for the display of data to a flight crew. In the advancement of the new technology associated with the FMS, multifunction displays have been developed in order to take advantage of the great variety of options available for the display of aircraft data. The present application claims new displays or presentations of aircraft data associated with a FMS. The present invention provides displays of aircraft data that is intended to increase the situational awareness of the members of a flight crew. The displays of the present invention employ commercially available systems that may be used without modification to supply the necessary signals to operate the displays of the present invention.

The present invention relates to improved displays of aircraft operation data that increase the situational awareness of a pilot and flight crew. More particularly, the displays of the present invention include an electronic display showing a graphic indicator of Actual Navigation Performance/Required Navigation Performance (ANP/RNP) for Area Navigation (RNAV) environments and precision approaches for an aircraft wherein the display is comprised of a RNP symbol, an ANP symbol, and a Course symbol. The display of the present invention may also include numeric values of RNP and ANP. The display of the present invention may also include complementary shaped RNP and Course symbols to allow a pilot to visually assess the present course of an aircraft in relation to RNP. The display of the present invention may also include changing depictions of an ANP symbol in the event of an aircraft exceeding RNP for a flight condition. The display of the present invention may include changing colors of any or all of the symbols to indicate an event of an ANP value within or outside of the requirements of RNP.

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which.

DETAILED DESCRIPTION OF THE EXAMPLE PREFERRED EMBODIMENTS

Figure 1:
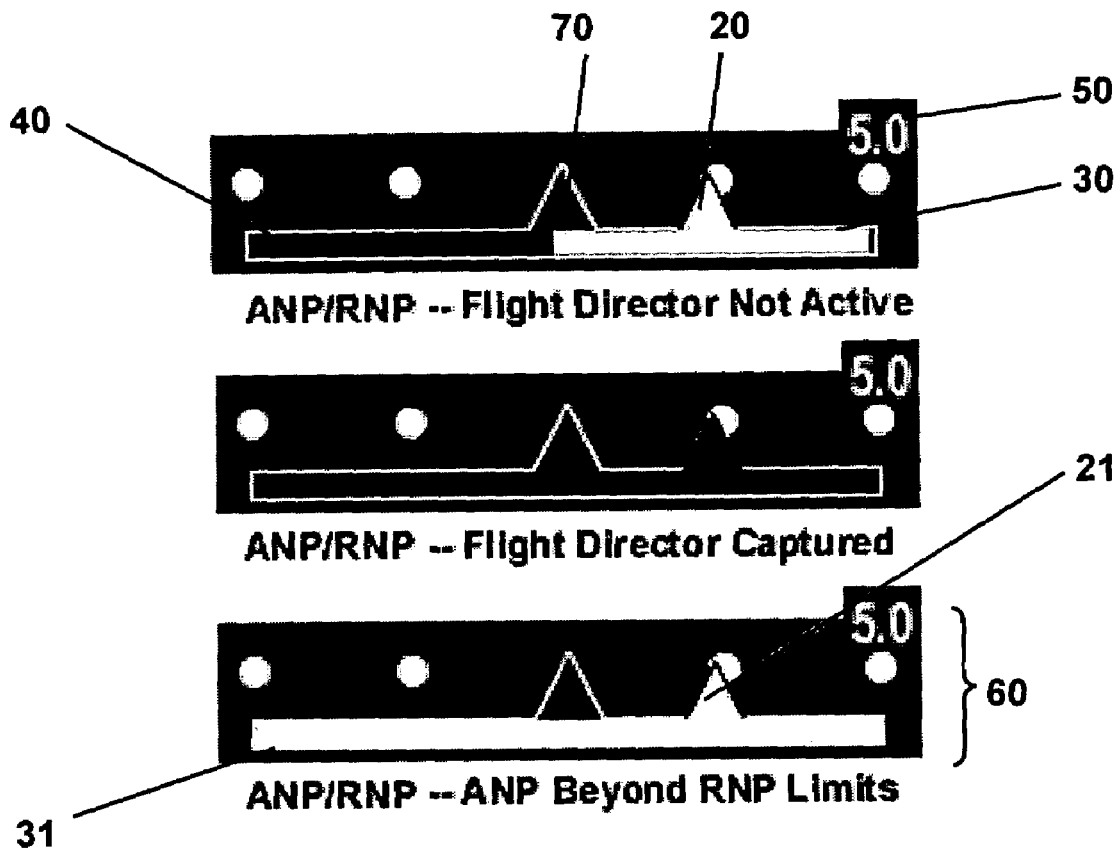
FIG. 1 illustrates an example embodiment of the ANP/RNP display of the present invention.

The example embodiments herein described are not intended to be exhaustive or to limit the invention to the precise forms disclosed. They are chosen and described to explain the principles of the invention and the application of the method to practical uses so that others skilled in the art may practice the invention.

The Primary Flight Display (PFD) utilized in the example embodiments of the present invention is a dynamic, color display of all of the parameters necessary for flight path control. A typical PFD provides data related to an aircraft in flight including heading, airspeed, altitude, attitude, and vertical speed.

RNP is the navigation performance necessary for flight within a defined airspace or route. RNP is a tool for the development of more efficient airspace and operations. A RNP level or type is applicable to a selected airspace, route, or procedure. The applicable RNP is expressed as a value that represents a distance in nautical miles from the intended position to the actual position of an aircraft. It is within this distance that an aircraft would normally be expected to operate. Typically this is the intended horizontal position in which an aircraft would be expected for at least 95% of the total flying time.

Area Navigation (RNAV) is the primary means for meeting RNP requirements. Most aircraft operating in the RNP environment use some type of RNAV equipment. RNAV operations within RNP permit flight in airspace within prescribed accuracy tolerances without the need to fly directly over ground based navigation facilities. In addition, the displays of the present invention may also be adapted for the presentation of aircraft data to monitor the performance of aircraft under Reduced Vertical Separation Minimum (RVSM). RVSM requires certain levels of performance within the vertical flight path of an aircraft.

An example embodiment of the present invention of an Actual Navigation Performance/Required Navigation Performance (ANP/RNP) scale may be displayed when commanded by the FMS (when FMS operation indicates an RNP required segment or procedure is being flown) as an alternate to the standard lateral deviation scale. Typically, the FMS must be the active navigation (NAV) source and be providing the lateral deviation data to the PFD. The ANP/RNP display, shown in FIG. 1, may be depicted centered on a display above the heading tape in place of the standard deviation scale. As shown in FIG. 1, a composite symbol representing the deviation pointer, alternatively referred to as a Course symbol 20, and ANP 30 performance (depicted in the example embodiment as a growing/shrinking band) is displayed with a size relative to the received RNP value 40.

The Course symbol 20 and ANP band 30 may move left or right with the lateral deviation displacement. Scaling of the deviation is the same as normal lateral deviation, and the full scale value 50 may be displayed over the right-most dot of the scale.

Shown centered below the Course symbol 20 in FIG. 1 is the ANP band 30 whose width may be a function of the ANP value and may be proportional to the width of the RNP value 40. For a given RNP value 40, the ANP band 30 may grow in width as ANP grows until the RNP requirements are exceeded. And, as shown at 60, at which point the ANP box 31 and Course symbol 21 may turn amber.

When the ANP/RNP source is selected and valid and the Flight Director (FD) is not active, the deviation pointer and ANP band may be shown in cyan. When the FD is coupled, the deviation pointer and ANP band may change to magenta. Symbology for alternate FMS source (not distinctly on-side) selection may be identical for simplicity, as the FMS source annunciation is displayed elsewhere.

Having shown and described example embodiments of the present invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

We claim:

1. An electronic display for graphically indicating actual navigational performance (ANP) for an aircraft relative to required navigational performance (RNP) under an RNAV flight condition, said display comprising:
   a RNP symbol, comprising a band having a length with an indicator centrally positioned therealong, the indicator representing a centerline of a required flightpath and the length indicating a magnitude of the required navigational performance; and
   an ANP symbol, comprising a band having a length with an indicator centrally positioned therealong, the indicator representing the course of the aircraft and the length indicating a magnitude of the actual navigational performance;
   wherein a shape of the ANP symbol corresponds to a shape of the RNP symbol, the RNP symbol represents the RNP requirements for said aircraft, and the ANP symbol partially overlaps and moves relative to the RNP symbol on the display to depict lateral displacement of said aircraft relative to the required flightpath.

2. The electronic display of claim 1, further comprising:
   a numeric display of the magnitude of RNP.

3. The electronic display of claim 2, wherein:
   the RNP symbol comprises a hollow outline matching the shape of the ANP symbol.

4. The electronic display of claim 1, wherein:
   the RNP symbol comprises a hollow outline matching the shape of the ANP symbol.

5. The electronic dIsplay of claim 3, wherein:
   the ANP symbol registers over the RNP symbol when the course of the aircraft is aligned with the required flightpath.

6. The electronic display of claim 4, wherein:
   the ANP symbol registers over the RNP symbol when the course of the aircraft is aligned with the required flightpath.

7. The electronic display of claim 3, wherein:
   the RNP and ANP indicators are inverted chevrons.

8. The electronic display of claim 4, wherein:
   the RNP and ANP indicators are inverted chevrons.

9. The electronic display of claim 1, wherein the:
   the length of the ANP symbol band increases proportionately with increasing deviation of ANP from the RNP requirements for the aircraft.

10. The electronic display of claim 1, wherein:
    the ANP symbol is depicted in a first color when the ANP is within RNP and is depicted in a second color when the ANP exceeds RNP for the aircraft.

11. The electronic display of claim 10, wherein:
    the second color for the ANP symbol is selected relative to the first color to attract the attention of a human operator.

12. The electronic display of claim 1, wherein:
    the maximum length of the ANP symbol band is limited to the length of the RNP symbol band.

13. The electronic display of claim 5, wherein the:
    the length of the ANP symbol band increases proportionately with increasing deviation of ANP from the RNP requirements for the aircraft.

14. The electronic display of claim 5, wherein:
    the ANP symbol is depicted in a first color when the ANP is within RNP and is depicted in a second color when the ANP exceeds RNP for the aircraft.

15. The electronic display of claim 4, wherein:
    the second color for the ANP symbol is selected relative to the first color to attract the attention of a human operator.

16. The electronic display of claim 5, wherein:
    the maximum length of the ANP symbol band is limited to the length of the RNP symbol band.

* * * * *

UNITED STATES PATENT AND TRADEMARK OFFICE
CERTIFICATE OF CORRECTION

| | | |
|---|---|---|
| PATENT NO. | : 7,046,170 B2 | Page 1 of 1 |
| APPLICATION NO. | : 10/662236 | |
| DATED | : May 16, 2006 | |
| INVENTOR(S) | : Hubert Naimer et al. | |

It is certified that error appears in the above-identified patent and that said Letters Patent is hereby corrected as shown below:

on the title page item (75),
delete "Hubert Naimer, Mascona (CH)" and insert -- Hubert Laurent Naimer, Ascona (CH) --.

delete "Ted" and insert -- Joachim Laurent --.

Signed and Sealed this

Twenty-second Day of August, 2006

JON W. DUDAS
*Director of the United States Patent and Trademark Office*